March 26, 1957 W. E. BRANDAU 2,786,330
TURBOJET ENGINE CONTROL SYSTEM
Filed April 29, 1949 3 Sheets-Sheet 1

INVENTOR.
WILLIAM E. BRANDAU
BY
ATTORNEY

March 26, 1957 W. E. BRANDAU 2,786,330
TURBOJET ENGINE CONTROL SYSTEM
Filed April 29, 1949 3 Sheets-Sheet 2

INVENTOR.
WILLIAM E. BRANDAU
BY
ATTORNEY

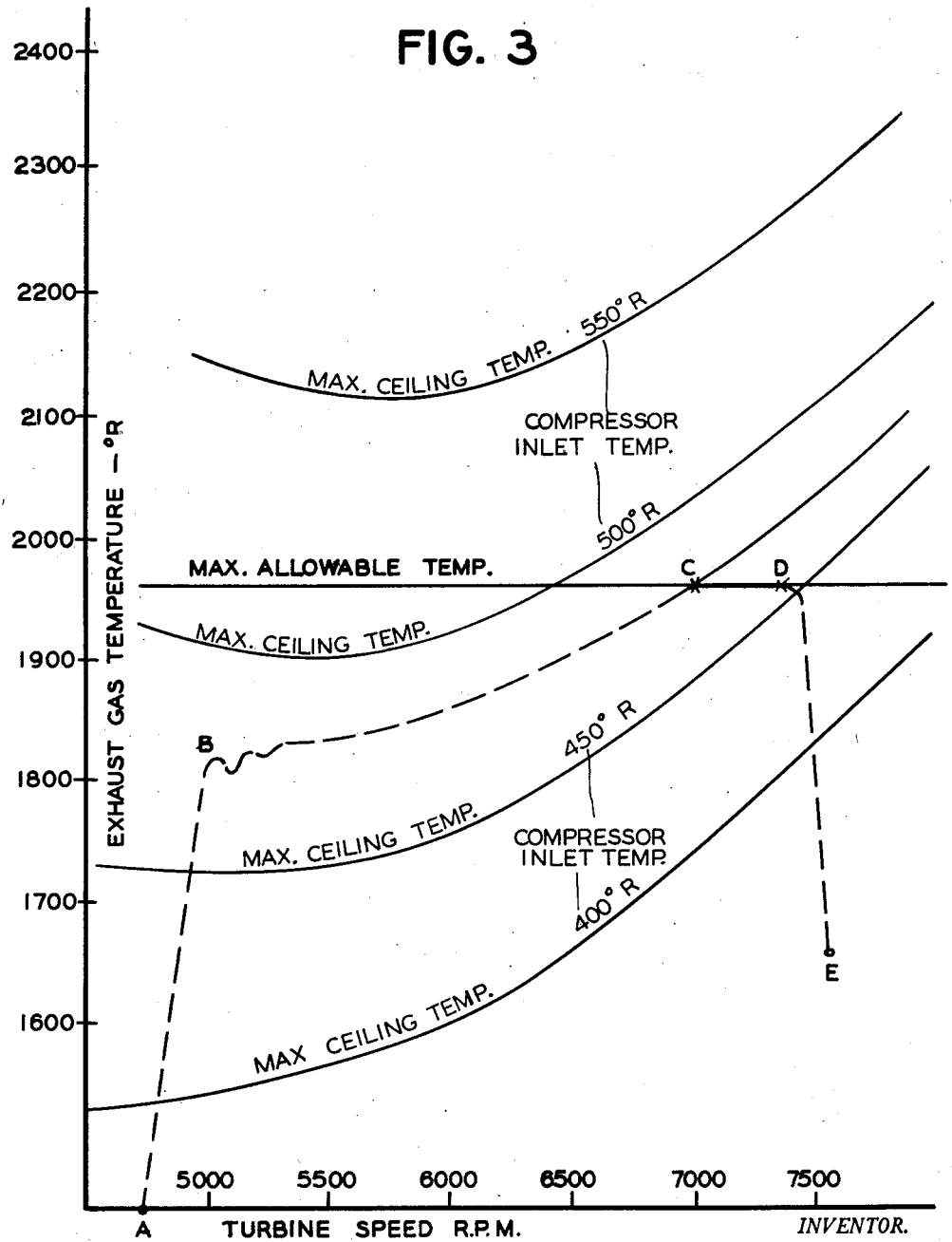

United States Patent Office 2,786,330
Patented Mar. 26, 1957

2,786,330

TURBOJET ENGINE CONTROL SYSTEM

William E. Brandau, Westwood, N. J., assignor to Bendix Aviation Corporation, Teterboro, N. J., a corporation of Delaware Application April 29, 1949, Serial No. 90,453

10 Claims. (Cl. 60—39.28)

The invention relates to a turbojet engine control system of high performance. It particularly relates to means to prevent compressor stall and temperature damage in a turbojet engine. It relates to improvements in, and specific electrical, electronic and mechanical means for, control systems such as appear in copending application, Serial No. 41,329, filed July 29, 1948, by William E. Brandau.

An object of the invention is to provide means for preventing compressor stall and overheating damage in a jet system.

Another object of the invention is to provide an improved means for overriding the normal action of the controller when a predetermined operating temperature is exceeded. An object related thereto is the provision of a follow-up means effective during such overriding periods to then maintain stability of the same degree as during normal control.

Another object of the invention is to provide means for determining the maximum instantaneous operating temperature of a jet system.

And still another object is to provide means for maintaining stability of control over a wide, safe range of engine operating conditions.

The invention broadly involves improvements in the control system described and claimed in copending application, Serial No. 41,329, filed July 29, 1948, by William E. Brandau.

A temperature-loop having a valve follow-up is used to provide stability during temperature-override periods, which occur when the temperature of the exhaust gases rises above a predetermined maximum, along with a speed follow-up or "speed bias" to eliminate the droop otherwise due to the valve follow-up. This predetermined maximum temperature is based on the physical properties of the components of the jet engine and is determined by the temperature they can withstand without injury. However, this does not take the stall region of the compressor into consideration. The stall region is a function of inlet temperature and compressor speed.

Under the invention in order to avoid the stall region of the compressor which varies with inlet temperature and compressor speed, there has been devised an inlet temperature sensing device and a compressor speed sensing device which varies the maximum permissible temperature so as to avoid stall conditions in accordance with a predetermined schedule. This schedule, of course, is dependent upon the characteristics of the particular engine to be controlled.

The schedules generally follow a given pattern so that as inlet temperature increases, the temperature sensing device tends to increase the ceiling temperature or maximum permissible combustion chamber temperature. However, as the speed of the compressor increases from idling to full throttle, the speed sensing device first tends to decrease the ceiling or maximum permissible temperature and then tends to increase the ceiling or maximum permissible temperature as full throttle is approached in accordance with a predetermined schedule to avoid stall conditions of the engine.

The above and other objects and features of the invention will appear more fully hereinafter from a consideration of the following description taken in connection with the accompanying drawings wherein one embodiment of the invention is illustrated by way of example.

In the drawings:

Figure 3 is a graph for providing a clearer explanation of the invention.

*A typical turbojet engine*

Figure 1:
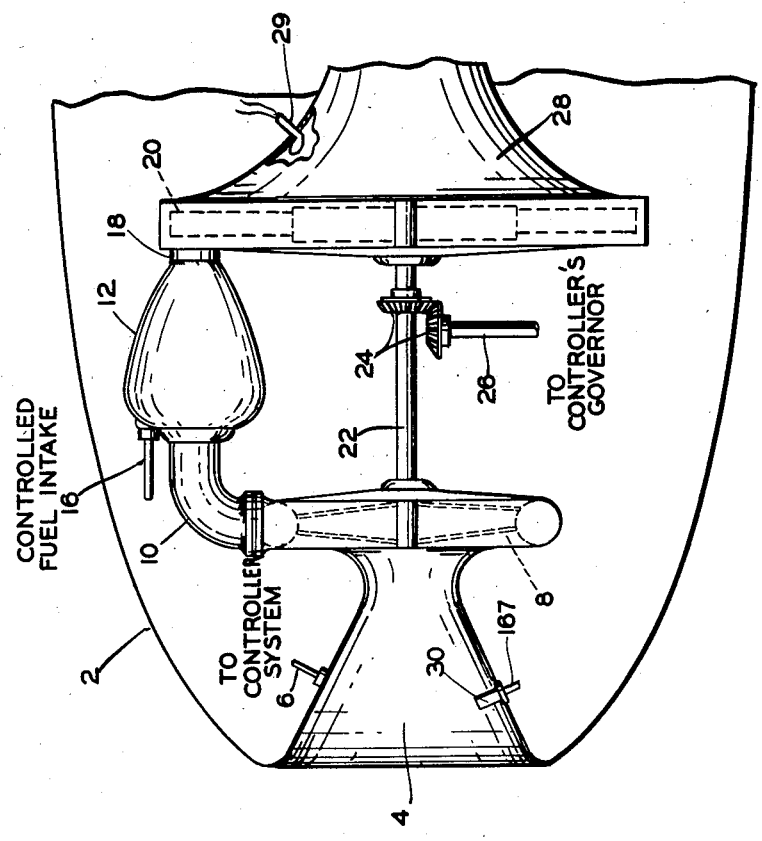
Figure 1 is a diagrammatic view of a typical turbojet engine showing the takeoffs for its controller.

Referring to Figure 1, the engine is mounted within a body 2, e. g. the nacelle of an aircraft which moves toward the left, in this figure, so that ambient air is rammed into an intake 4 with a pressure intake 6 therein for connection to the engine control system or controller. This air is compressed by a blower or compressor 8 and flows through a conduit 10 into a combustion chamber 12. Fuel at a controlled rate is fed through a line 16 into the combustion chamber 12.

The products of combustion flow out through a nozzle 18 to a drive turbine wheel 20 which drives the compressor 8 through a shaft 22. Gearing 24 and a shaft 26 connect the turbine shaft 22 with the speed governor of the controller. The turbine exhaust exits through a jet-tube 28 in which is secured a means 29 sensitive to the exhaust gas temperature. A thermostat 30 sensitive to the intake air temperature is secured in the intake 4 for a purpose which will be explained hereinafter.

From the standpoint of automatic control, response lags of the engine tend to produce instability which requires either damping or a rate component for neutralization. Main sources of such lags are the inertia of the turbine's rotating parts, the time for combustion of fuel, and the time required for air to pass through the engine. On the other hand, the strong self-regulation of the engine itself strongly assists the controller in maintaining stable control.

Figure 2:
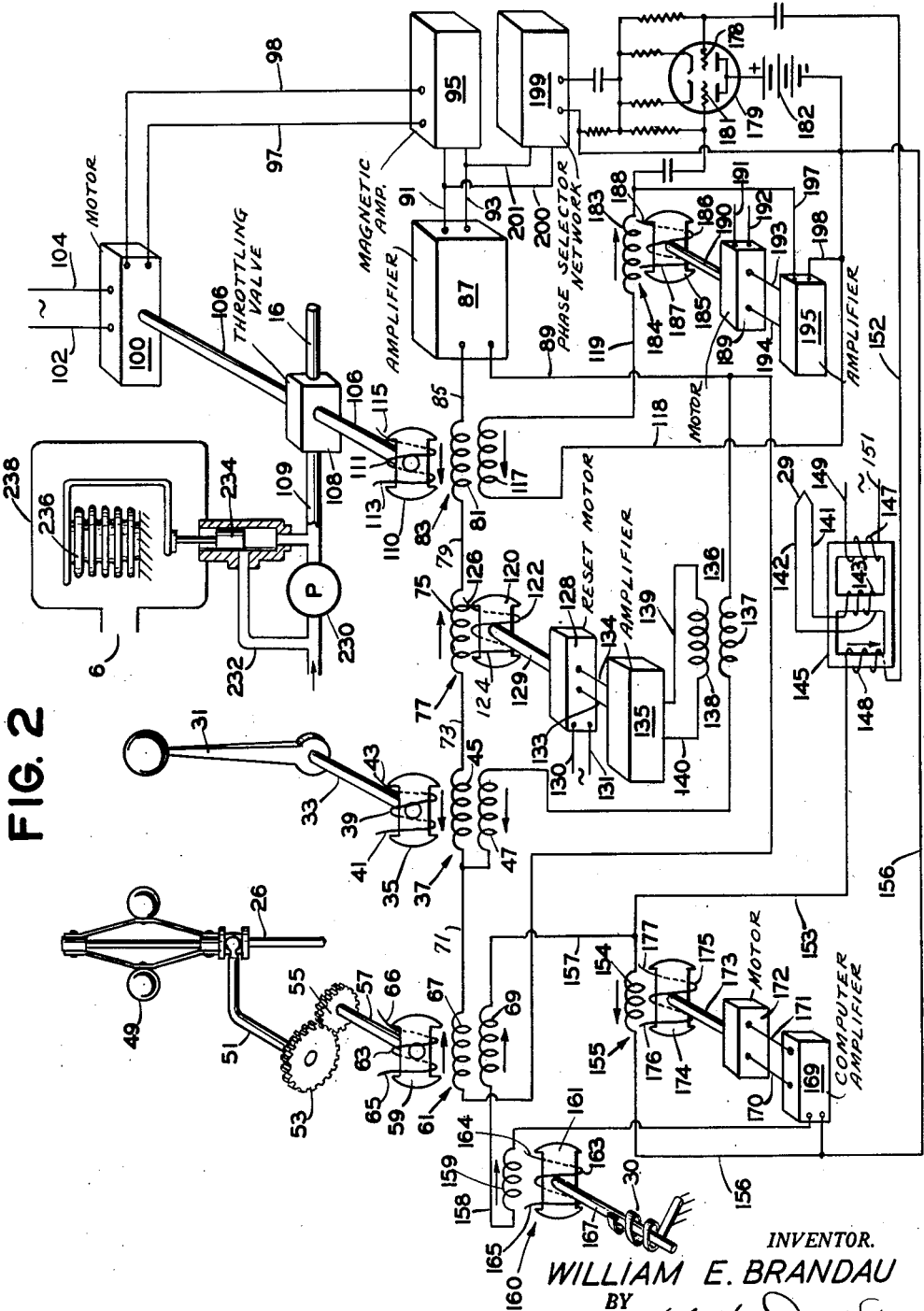
Figure 2 is a schematic diagram of a turbojet engine controller under the invention, including electronic control means for carrying out certain specified functions.

Referring to the drawing of Figure 2, there is indicated by the numeral 31 a pilot's control lever operably connected through a shaft 33 to a rotor 35 of a variable coupling transformer 37. The rotor 35 has a winding 39 connected by leads 41 and 43 across a main source of alternating current having a constant frequency. The rotor winding 39 is inductively coupled to stator windings 45 and 47. The coupling relation between the rotor and stator windings varies with the position of the control lever 31.

Driven by the shaft 26 from the turbine 20 is a flyball governor 49 of conventional type and which is mechanically connected through a rotary arm 51, gears 53 and 55, and a shaft 57 to a rotor 59 of a speed responsive variable coupling transformer 61. The rotor 59 has a winding 63 connected by leads 65 and 66 across the main source of alternating current having a constant frequency. The rotor winding 63 is inductively coupled to stator windings 67 and 69. The coupling relation between the rotor and stator windings varies with the position of the fly-ball governor 49 which is responsive to the speed of the turbine 20.

The stator winding 67 of the speed synchro 61 is connected at one end through a conductor 71 in series with the stator winding 45 of the transformer 37 which is in turn connected through a conductor 73 to a stator winding 75 of a speed reset variable coupling transformer 77, the purpose of which will be explained hereinafter.

The stator winding 75 is connected by a conductor 79 with a stator winding 81 of a speed follow-up variable coupling transformer 83 which is in turn connected through a conductor 85 to the input of an amplifier 87. The opposite end of the winding 67 of the speed responsive transformer 61 is connected through a conductor 89 to the input of the amplifier 87. The amplifier 87 may be of a conventional type or may be of a type such as shown in the copending application, Serial No. 792,885, filed December 20, 1947 by Adolph Warsher and now U. S. Patent No. 2,493,605, granted January 3, 1950, and assigned to Bendix Aviation Corporation.

It will be seen then that there is provided an input loop circuit to the amplifier 87 which includes the stator winding 67 of the speed responsive transformer 61, stator winding 45 of the speed selector transformer 37, stator winding 75 of the speed reset transformer 77, and stator winding 81 of the speed follow-up transformer 83.

The winding 39 is arranged in relation to windings 45 and 47 so that the voltage induced from winding 39 into windings 45 and 47 will be 180 degrees out of phase with the voltage induced in winding 67 from winding 63. The amplitude of the voltages induced in windings 45 and 47 will be equal and dependent upon the coupling relation between winding 39 and the windings 45 and 47, while the amplitude of the voltage induced in winding 67 will be dependent upon the coupling relation between winding 63 and winding 67 which is in turn dependent upon the speed of the turbine 20 driving the fly-ball governor 49 through shaft 26.

When the voltage induced in winding 45 equals that induced in winding 67, no differential or signal voltage will be applied across input lines 85 and 89.

However, upon the voltage induced in winding 67 exceeding that induced in winding 45, a signal voltage will be applied across lines 85 and 89 having a phase relation indicating a speed of the engine or turbine 20 in excess of that selected by the position of the rotor 35, while upon the voltage induced in winding 45 exceeding that induced in winding 67 there will be applied to lines 85 and 89, a signal voltage having an opposite phase relation and indicating a speed of the engine or turbine 20 less than that selected by the position of the rotor 35.

Output conductors 91 and 93 lead from the amplifier 87 to a magnetic amplifier 95 of conventional type or of a type such as shown, for example, in the U. S. Patent No. 2,432,036, granted December 2, 1947, to Paul A. Noxon and assigned to Bendix Aviation Corporation.

Output conductors 97 and 98 lead from the magnetic amplifier 95 to the control winding of a two-phase motor 100. The other winding of the motor 100 is connected by conductors 102 and 104 across the main source of alternating current.

The motor 100 adjusts through a shaft 106 a fuel throttling valve 108 which connects fuel conduits 16 and 109 and controls the fuel supplied to the combustion chamber 12 through conduit 16.

Upon the speed of the turbine 20 decreasing below that for which the transformer 37 is set, a signal voltage applied to the amplifier 87 and magnetic amplifier 95 will be impressed across the motor control lines 97 and 98 of such a phase as to cause rotation of the shaft 106 and adjustment of the fuel throttling valve 108 in a direction to increase the supply of fuel to the combustion chamber 12 to in turn increase the speed of the engine of turbine 20 to the selected value. If the speed of the engine increases above that for which the transformer 37 is set, the signal voltage across lines 97 and 98 will have an opposite phase relation causing rotation of the motor 100 in an opposite direction to decrease the fuel supplied through throttling valve 108 and thereby decrease the engine speed to the selected value. It will be seen then that the voltage of the speed selector transformer 37 bucks that of the speed responsive transformer 61. The voltage of the transformer 61 calls for less engine speed while the voltage of the transformer 37 calls for an increase in the speed of the engine.

The predominating signal voltage, of course, controls the action of the motor 100 and tends to maintain the speed selected through the transformer 37 by the position of the pilot's control lever 31.

*Speed follow-up*

As shown in Figure 2, the motor 100, in addition to positioning the throttling valve 108 through shaft 106, also positions, through shaft 106, a rotor 110 of the speed follow-up transformer 83. The rotor 110 has a rotor winding 111 connected through conductors 113 and 115 to the main source of alternating current. The winding 111 is further inductively coupled to the stator winding 81 and a second stator winding 117 of the transformer 83. The stator winding 117 has output leads 118 and 119 for a purpose which will be explained hereinafter. The winding 111 is arranged to induce in the winding 81 a voltage which is in phase with the voltage induced in the winding 67 and 180 degrees out of phase with the voltage induced in the winding 45 so as to tend to add to the voltage induced in the winding 67 a follow-up voltage which increases upon adjustment of the rotor 110 by the motor 100 in a valve closing direction decreasing fuel or engine speed and tending to rebalance the differential or signal voltage across the lines 85 and 89 occurring upon an unbalanced relation between the differential transformers 37 and 61. Upon a call for increased fuel or engine speed, the rotor 110 is adjusted in an opposite valve opening direction and tending to decrease the additive effect of the follow-up transformer 83 on the transformer 37 and effect a reverse follow-up action. The follow-up action aforenoted occurs instantaneously upon adjustment of the throttling valve 108 by the motor 100, to give a well damped speed control to the fuel throttling valve 108.

*Speed reset action*

A further reset action is effected through operation of the speed reset transformer 77 which includes a rotor 120 having a rotor winding 122 connected through conductors 124 and 126 across the main source of alternating current. The winding 122 is inductively coupled to winding 75 so as to induce a voltage therein which bucks the voltage in the follow-up winding 81. The follow-up droop is removed by a slow-speed reversible electrical reset motor and train assembly 128 which drives the rotor 120 through shaft 129 and in a direction to slowly remove the error between the selected speed and actual speed introduced by the follow-up transformer 83. The rotor 120 is relatively slowly adjusted by the motor 128 which may be of the conventional two-phase type having a winding connected through conductors 130 and 131 across the source of alternating current and a control winding connected by conductors 133 and 134 to the output of an amplifier 135. The reset amplifier 135 may be of conventional type or may be of a type such as shown and described in copending application Serial No. 792,885, filed December 20, 1947, by Adolph Warsher and now U. S. Patent No. 2,493,605, granted January 3, 1950, and assigned to Bendix Aviation Corporation.

Controlling the input to the amplifier 135 is a loop circuit including the winding 67 of the speed responsive transformer 61 and the reset selector winding 47 of the selector transformer 37. This loop circuit is inductively coupled to the amplifier 135 by transformer 136 having a primary winding 137 connected in the loop circuit and a secondary winding 138 connected by conductors 139 and 140 in the input circuit of the amplifier 135. The winding 47 is inductively coupled to the winding 39 of the transformer 37 and there is induced in the winding 47 a voltage which acts in opposition to the voltage induced in the winding 67 so that a differential or reset signal voltage is induced across input lines 139 and 140 upon the actual speed being above or below that selected through the transformer 37. The latter signal voltage will have a phase relationship dependent upon whether the speed exceeds the selected value thus causing a predominating voltage in the winding 67 of one phase or whether the speed of the engine is below that selected, whereupon a predominating voltage will be induced in the winding 47 in an opposite phase.

Thus, when the speed of the engine exceeds the selected speed, the signal voltage applied through the amplifier 135 to the control winding of the motor 128 will cause rotation slowly of the rotor 120 in a direction to cause the induction in the winding 75 of a reset voltage tending to oppose and wipe out the follow-up voltage induced in the winding 81. The voltage induced by the winding 122 in the winding 75 is opposite in phase to that induced in the winding 81 by the winding 111 so that a follow-up movement of the winding 111 to increase the voltage induced in the winding 81 will be followed by a slow rotation of the rotor 120 and winding 122 to induce in the winding 75 an increasing voltage of opposite phase to tend to wipe out the follow-up voltage induced in the winding 81.

The speed selector circuit is believed to be novel and has been specifically disclosed and claimed in my co-pending application Serial No. 41,329, filed July 29, 1948. The speed selector circuit provides a double input voltage, the lag to the reset amplifier 135 being less than that of the main speed amplifier 87 by the amount of the follow-up and reset voltages. Thus, no steady state change in reset magnitude is required by changing throttle position. A further refinement may be introduced by reducing the spread of the selectors slightly to require a small reset change of such magnitude that it exactly equals the amount that the reset runs during a normal transient. As a result, the turbine will arrive at its new steady state dead-on speed. The arrows shown adjacent the several windings 45, 67, 75 and 81; and 67 and 45 indicate diagrammatically the operating relationship of the several windings one to the other.

In the conventional proportional plus reset controller, the reset is affected by the follow-up with the result that normal control is considerably delayed (of the order of one minute) after setting a new control speed, while the reset is gradually wiping out the initial follow-up action.

In the subject controller, however, following a new control setting for increasing the speed, the reset speed is brought to zero as soon as the turbine 20 comes up to the new speed setting and the other speed control loop is likewise balanced (except for the reset action in the short initial period), while the valve 108 is being driven to its proper position and the speed signal to its proper value. The reset motor 128 runs then in the opposite direction for another like short interval, however, being at no time feinted out of its central most effective control position from which it floats as required to meet persistent load demands for a turbojet unit which is otherwise already fully compensated for changes in altitude.

By slightly lowering the speed selector sensitivity and accepting a slight steady state change of the reset position, "dead-beat" governing may be obtained following the new speed setting.

Novel compressor stall computer

A novel feature of the present application is the provision in the subject control of a compressor stall computer temperature control with a maximum temperature override. Turbine speed and compressor inlet temperature are sensed to determine the maximum permissible instantaneous turbine temperature at which the compressor will surge. This variable temperature is maintained by proper fuel flow control until speed error is satisfied but will be topped-off by an absolute ceiling temperature. The temperature probe 29 may be of a conventional type or of a type such as shown and described in the co-pending application Serial No. 17,676, filed March 29, 1948, jointly by William R. Polye and William E. Brandau and now U. S. Patent No. 2,483,350, granted September 27, 1949, and assigned to Bendix Aviation Corporation. The temperature probe 31 may be of the conventional helical bi-metal type.

As shown in Figure 2, output conductors 141 and 142 lead from the thermocouple 29 to a suitable control winding 143 of a saturable core reactor 145 having a primary winding 147 and a secondary winding 148. The primary winding 147 is connected by conductors 149 and 151 to the main source of alternating current while the secondary winding 148 has output conductors 152 and 153. The amplitude of the voltage induced in secondary winding 148 by winding 147 is a function inversely of the amount of D. C. current fed to the control winding 143 by the thermocouple 29 in response to the temperature at the tail cone 28. Thus, upon an increase in the temperature at the tail cone 28, the D. C. voltage across the input lines 141—142 of the saturating coil 143 increases causing in turn a decrease in the voltage induced in the secondary winding 148 by the primary winding 147, while a decrease in the temperature at the tail cone effects an increase in the induced voltage in secondary winding 148.

The winding 148 is connected by conductor 153 in series with a ceiling or stator winding 154 of a variable coupling transformer 155. The opposite side of the winding 154 is connected to conductor 156. The voltage induced in winding 148 is 180 degrees out of phase with that induced in winding 154. The speed bias winding 69 of the speed responsive transformer 61 is connected at one side to conductor 157 and at the opposite side by a conductor 158 to one side of stator winding 159 of a variable coupling transformer 160. The transformer 160 has a rotor 161 having a winding 163 connected by conductors 164 and 165 to the main source of alternating current. The rotor 161 is connected by a shaft 167 to the thermostat 30, which as indicated in Figure 2, may be of a helical thermostatic element of conventional type and adapted to rotate the shaft 167 and thereby winding 163 upon change in the temperature of the compressor air intake. The coupling between the rotor winding 163 and the stator winding 159 of the transformer 160 is dependent upon the temperature of the compressor air intake. The voltages induced in the windings 69 and 159 act in additive relation and are 180 degrees out of phase with the voltage induced in winding 154, as will be explained, and the resultant voltage is fed into the input of a computer amplifier 169. The output from the amplifier 169 is then applied by conductors 170 and 171 to a reversible motor 172. The motor 172 is connected by a shaft 173 to a rotor 174 of the transformer 155. The rotor 174 has a winding 175 connected by conductors 176 and 177 to the main source of alternating current. The amplitude of the voltage induced in the winding 154 will be dependent upon the coupling relation between the winding 175 and winding 154 which is in turn dependent upon the resultant voltage computed from the speed of the turbine 20 affecting the winding 69 and the compressor air intake temperature affecting the voltage induced in winding 159.

The transformer 155 is so arranged that the voltage induced in the secondary winding 154 is 180 degrees out of phase with the voltage induced in winding 148 by the winding 147 and the one opposes the other as indicated diagrammatically by the arrows adjacent the windings 148 and 154 so that when out of balance a difference or signal voltage is applied to a control grid 178 of an electronic mixing tube 179 through the conductor 152 and conductor 156 of the mixing tube 179. The mixing tube 179 is of the type having multigrids 178 and 181 and a common anode and a common cathode and a source of plate voltage 182 which are well known in the art. The output is the resultant of the voltages applied to the respective control grids.

The secondary winding 148 of the saturable reactor 145 is so arranged in relation to the ceiling reference winding 154 that at temperatures below a predetermined maximum ceiling temperature beyond which stalling of the compressor may occur the voltage induced in the winding 148 will be greater than that of the bucking voltage induced in the reference winding 154. However, upon the temperature exceeding the maximum ceiling temperature, as during acceleration of the turbine 20 to reach a set speed, the D. C. voltage across the control coil 143 will affect the saturable reactor 145 so as to reduce the induced voltage in winding 148 below that of the ceiling reference winding 154 whereupon the phase of the voltage induced in the winding 154 will predominate.

The maximum ceiling temperature varies with the inlet temperature and engine speed which effects through the windings 159 and 69 the setting of the ceiling reference winding 154. However, upon the temperature approaching a maximum allowable temperature, beyond which the combustion chamber may be damaged, the voltage induced in winding 148 is sufficient to affect an overcontrol action preventing the temperature from exceeding the maximum allowable temperature, as indicated in the graph of Figure 3.

*Temperature follow-up*

The temperature follow-up winding 117 is connected at one end through conductor 118 to conductor 156 and thereby to the cathode of the mixing tube 179. At the opposite end the winding 117 is connected through conductor 119 and winding 183 to the control grid 181. Rotation of the motor 100 in a direction to close valve 108 causes rotation of the rotor 110 in a direction to increase the voltage induced in the temperature follow-up winding 117 of a phase applied to grid 181 such as to buck the predominating voltage applied to grid 178 of the resultant temperature ceiling voltage. The output of the tube 179 will be the resultant of the voltages applied to the grids 178 and 181 and provides a stabilizing follow-up voltage to the output of the mixing tube 179.

*Temperature reset action*

A further reset action is effected through operation of a temperature reset variable coupling transformer 184 which includes a rotor 185 having a rotor winding 186 connected through conductors 187 and 188 across the main source of alternating current. The winding 186 is inductively coupled to the stator winding 183 so as to induce a voltage therein which bucks the voltage in the temperature follow-up winding 117. The follow-up droop is removed by a slow-speed reversible electric reset motor and train assembly 189 which drives the rotor 185 through shaft 190 and in a direction to slowly remove the error between the selected temperature and the actual temperature introduced by the temperature follow-up winding 117. The rotor 185 is relatively slowly adjusted by the motor 189 which may be of the conventional two-phase type having a winding connected through conductors 191 and 192 across the main source of alternating current and a control winding connected by conductors 193 and 194 to the output of an amplifier 195.

The input to the amplifier 195 is controlled by the difference in the voltages induced in windings 117 and 183 and connected to amplifier 195 through conductor 118, conductor 198 and conductor 197. This signal voltage across the input of amplifier 195 will have a phase relationship dependent upon whether the temperature exceeds the selected value, thus causing the valve 108 to close, whereupon the difference between the voltages in the windings 117 and 183 will be of one phase or whether the temperature is below that selected value causing the valve 108 to open, whereupon the predominating voltage across amplifier input lines 197 and 198 will be in opposite phase.

Thus the voltage introduced in the winding 183 is opposite in phase to that in winding 117 so that it tends to oppose and wipe out the follow-up voltage induced in winding 117. A follow-up movement of the winding 111 to increase the voltage induced in the winding 117 will be followed by a slow rotation of the rotor 185 and winding 186 to induce in the winding 183 an increasing voltage of opposite phase to tend to wipe out the follow-up voltage induced in the winding 117.

*Phase selector*

The output from the mixer tube 179 is applied to a phase selector network indicated generally by the numeral 199 and which is so designed as to permit the passage of a signal voltage to output lines 200 and 201 of a phase corresponding to that induced in the ceiling reference winding 154 and indicative of a tail cone temperature in excess of either maximum ceiling temperature or maximum allowable temperature dependent upon which is the lower, while preventing the passage of a signal voltage of an opposite phase or a phase corresponding to that induced in the winding 148. Thus, a signal voltage calling for more fuel or temperature may be blocked out through action of a phase selector 199, while a signal voltage calling for a decrease in fuel or temperature upon the tail cone temperature being excessive may be passed through output lines 200 and 201 to input lines 91 and 93 of the magnetic amplifier 95. The latter signal voltage to decrease the fuel and temperature of the engine is of sufficient amplitude as to override any signal voltage from the speed responsive amplifier 87 tending to call for opening of the valve 108 to supply more fuel or increase in the speed of the engine and is subject to the stabilizing follow-up effect hereinbefore described.

The phase selector circuit 199 has been specifically disclosed in my co-pending application Serial No. 41,329, filed December 31, 1948.

*Speed bias*

It should be borne in mind that excessive rise in the combustion chamber temperature occurs at such time as the control lever 31 is set for increased speed and rapid acceleration of the engine is demanded so that upon the valve 108 in response to the temperature loop circuit tending to close and decrease the fuel supply, the temperature decreases below the limit set by the temperature loop circuit whereupon the speed loop circuit calls for further increase in speed of the engine and a further opening of the valve 108, as previously described.

Further increase in speed of the engine due to the setting of valve 108 causes the fly-ball governor 49 to adjust the rotor winding 63 so as to increase the voltage induced in winding 67 and a phase opposite to that of the voltage induced in winding 117, so as to in time wipe out the follow-up voltage induced in winding 117 and return the engine temperature to the limited value set by the resultant temperature ceiling winding 154.

It will be seen then that so long as the speed of the engine is below that for which the lever 31 is set and the engine is accelerating, the speed loop tends to call for more fuel and increase in temperature, while the temperature loop is continuously acting to bring the temperature back to the limited temperature value, until such time as the engine speed reaches the preselected value. After the engine speed reaches the selected value, the speed loop then effects regulation of the valve 108 so as to prevent the engine speed from exceeding such selected value by continuously throttling the fuel whereupon the engine temperature continuously decreases to well below the permitted maximum until the throttle valve is adjusted to a position or opening at which time the preselected speed may be maintained constant.

Operation

The operation of the control system may be more clearly understood by referring to the graph of Figure 3 in which turbine speed is plotted against exhaust gas temperature. The inlet compressor temperature curves plotted against turbine speed are superimposed on the graph. The relation of the inlet compressor temperature curves with the exhaust gas temperature is determined by the stall characteristics of the particular engine.

The dashed line illustrates the temperature transient from idle to full throttle. The temperature starts from the steady-state idle speed at A and rises rapidly to B where it is arrested by the maximum ceiling temperature of the stall computer. It then rises with speed to C where it is arrested by the maximum allowable temperature, steadies to D and then falls abruptly to E as the turbine approaches a steady-state speed. As indicated on the graph of Figure 3, the maximum ceiling temperature varies with the air inlet temperature and turbine speed.

Altitude compensation

As shown in Figure 2, the fuel in conduit 109 is under pressure of a pump 230. A conduit 232 is arranged to return a portion of the fuel from the outlet of the pump 230 to the pump inlet. The latter conduit is controlled by a valve 234 operated by an aneroid 236 in a chamber 238 connected through conduit 6 to the ram air inlet 4.

In a turbojet engine, the mass-rate of airflow into the engine varies directly with the absolute pressure of such air and hence the mass-rate of fuel flow must be kept in proportion to the airflow which is done by making the differential pressure across the fuel valve proportional to absolute pressure of such air through the compensating action effected by valve 234.

Although only one embodiment of the invention has been illustrated and described, various changes in the form and relative arrangements of the parts may be made to suit requirements.

What is claimed is:

1. A control mechanism for an aircraft engine having an intake, a combustion chamber and a turbine driven by the exhaust gases from said chamber, comprising, in combination, means for controlling supply of fuel to said combustion chamber, means for regulating a condition of said fuel control means in response to the speed of said turbine and to maintain a predetermined turbine speed, follow-up means responsive to change of condition of said fuel control means for temporarily inhibiting further change, a reset means including a relatively slowly operating means to gradually introduce a follow-up off-setting action in direct response to the turbine speed, a manually operably member for setting the predetermined turbine speed and said reset means, means responsive to turbine speed and intake temperature for determining maximum temperature of said exhaust gases, an element responsive to the temperature of said exhaust gases, means operatively connecting said temperature responsive means to said fuel control means so as to override said regulating means to prevent said temperature from exceeding said maximum during acceleration of said turbine to meet said predetermined turbine speed, temperature follow-up means responsive to a change of condition of said fuel control means for temporarily inhibiting said overriding action, and temperature reset means to introduce a temperature follow-up offsetting action in direct response to increase in the turbine speed.

2. A control mechanism for determining the maximum instantaneous operating temperature of an aircraft engine having an intake, a combustion chamber, and a turbine driven by the exhaust gases from said chamber, comprising, in combination, means for deriving a first control voltage proportional to the speed of said turbine, means for deriving a second control voltage proportional to the temperature of said intake, and means for integrating said voltages to obtain a third control voltage proportional to said maximum instantaneous operating temperature.

3. The combination defined by claim 2 including a temperature reset means to introduce a temperature follow-up off-setting action in response to an increase in engine speed.

4. The combination defined by claim 2 including means for limiting said third control voltage to a predetermined maximum whereby said maximum instantaneous operating temperature does not exceed a predetermined temperature.

5. For use with an aircraft engine having an intake, a combustion chamber and a turbine driven by the combustion gases from said chamber; a combination comprising a valve to control the flow of a combustible fuel to said chamber, a reversible electric motor for positioning said valve, a loop circuit for controlling the position of said valve through said motor so as to maintain a predetermined engine speed, said loop circuit including a first device responsive to engine speed, a second device acting in opposition to said first device, manually operable means to adjust said second device to select said predetermined engine speed, and a follow-up device adjusted by said motor upon changing the position of said valve so as to temporarily inhibit further change in the position of the valve, a temperature determining circuit including a first element responsive to engine speed and a second element responsive to the temperature of said intake, means for deriving a signal voltage determined by said last two elements, a fourth device responsive to said signal voltage, another loop circuit for controlling the position of said valve through said motor so as to override said first mentioned loop circuit upon the temperature of the combustion gases exceeding a value determined by said temperature determining circuit, said other loop circuit including said fourth device, and a third element responsive to the temperature of said combustion gases, and said follow-up device adjusted by said motor and electrically connected to effect said other loop circuit so as to temporarily inhibit said overriding action.

6. For use with an aircraft engine having an intake, a combustion chamber and a turbine driven by the combustion gases from said chamber; the combination comprising a valve to control the flow of a combustible fuel to said chamber, a reversible electric motor for positioning said valve, a loop circuit for controlling a position of said valve through said motor so as to maintain a predetermined engine speed, said loop circuit including a first device responsive to engine speed, a second device acting in opposition to said first device, manually operable means to adjust said second device to select said predetermined engine speed, a follow-up device adjusted by said motor upon changing the position of said valve so as to temporarily inhibit further change in the position of the valve, a reset device in said first mentioned loop circuit, a second reversible electric motor to relatively slowly adjust said reset device, a second loop circuit for controlling the adjustment of said reset device through said second motor so as to gradually offset the inhibiting effect of said follow-up device, said second loop circuit including said second device acting in opposition to said first device and adjustable through said manually operable means to set said reset means, a third loop circuit for controlling the position of said valve through said first mentioned motor so as to override said first mentioned loop circuit upon the temperature of the combustion gases exceeding a maximum temperature value determined by said turbine speed and the temperature of said intake, said third loop circuit including an inductive element responsive to said turbine speed and said intake temperature for setting said maximum temperature value, an element responsive to the temperature of said combustion gases, said follow-up device adjustable by said first mentioned motor to temporarily inhibit said overriding action, and said first device to introduce a temperature follow-up offsetting effect in said third loop circuit in response to an increase in engine speed.

7. In a system for controlling the operation of a turbojet engine having an air intake, a combustion chamber, a compressor for supplying air from said intake to said chamber, and means driven by combustion gases from said chamber for driving said compressor; the combination comprising compressor speed regulating means, combustion gas temperature responsive means for overriding said speed regulating means upon the temperature of said combustion gases exceeding a selected maximum value, and means to select the maximum temperature value including first air intake temperature responsive means and second compressor speed responsive means, said first and second means cooperating to select said maximum temperature value.

8. In a control system for preventing compressor stall in a turbojet engine having an air intake, a combustion chamber, a compressor for supplying air from said intake to said chamber, and means driven by combustion gases from said chamber for driving said compressor; the combination comprising compressor speed selecting means, means responsive to the temperature of the air in said intake to derive a first control voltage, means responsive to the speed of said compressor to derive a second control voltage, means responsive to said control voltages to override said speed selecting means upon the temperature of said combustion gases exceeding a temperature proportional to said control voltages.

9. For use in controlling the operation of a turbojet engine having an air intake, a combustion chamber, a compressor for supplying air from said intake to said combustion chamber, and means driven by exhaust gases from said chamber for driving said compressor; the combination comprising engine speed regulating means, means for overriding said speed regulating means upon the temperature of said exhaust gases exceeding a maximum value, and means to determine said maximum temperature value including an adjustable temperature setting means, electrically responsive means for adjusting said setting means, and control means for said electrically responsive means including air intake temperature responsive means and engine speed responsive means.

10. For use in controlling the operation of a turbojet engine having an air intake, a combustion chamber, a compressor for supplying air from said intake to said combustion chamber, and means driven by the exhaust gases from said chamber for driving said compressor; the combination comprising engine speed regulating means, means for overriding said speed regulating means upon the temperature of said engine exceeding a maximum value, and means to determine said maximum value including first air intake condition responsive means and second engine operating condition responsive means, said first and second means cooperating in determining said maximum temperature value.

References Cited in the file of this patent
UNITED STATES PATENTS

| | | |
|---|---|---|
| 2,336,232 | Doran | Dec. 7, 1943 |
| 2,403,371 | Ifield et al. | July 2, 1946 |
| 2,404,428 | Bradbury | July 23, 1946 |
| 2,432,177 | Sedille | Dec. 9, 1947 |
| 2,478,909 | Flagle | Aug. 16, 1949 |
| 2,499,232 | Strub | Feb. 28, 1950 |